Sept. 9, 1958

G. A. MATTHEWS 2,851,567

AUTOMATIC RECLOSER

Original Filed Aug. 31, 1949

INVENTOR.
GEORGE A. MATTHEWS

BY Ostrolenk & Faber

ATTORNEY

Sept. 9, 1958   G. A. MATTHEWS   2,851,567
AUTOMATIC RECLOSER
Original Filed Aug. 31, 1949   7 Sheets-Sheet 2

INVENTOR.
GEORGE A MATTHEWS
BY Ostrolenk & Faber
ATTORNEY

Sept. 9, 1958

G. A. MATTHEWS 2,851,567

AUTOMATIC RECLOSER

Original Filed Aug. 31, 1949

INVENTOR.
GEORGE A. MATTHEWS

BY Ostrolenk & Faber
ATTORNEY

Sept. 9, 1958 G. A. MATTHEWS 2,851,567
AUTOMATIC RECLOSER
Original Filed Aug. 31, 1949 7 Sheets-Sheet 4

INVENTOR.
GEORGE A. MATTHEWS

BY Ostrolenk & Faber
ATTORNEY

Sept. 9, 1958 G. A. MATTHEWS 2,851,567
AUTOMATIC RECLOSER
Original Filed Aug. 31, 1949 7 Sheets-Sheet 5

INVENTOR.
GEORGE A. MATTHEWS

BY Ostrolenk & Faber
ATTORNEY

Sept. 9, 1958
G. A. MATTHEWS
2,851,567
AUTOMATIC RECLOSER
Original Filed Aug. 31, 1949
7 Sheets-Sheet 6
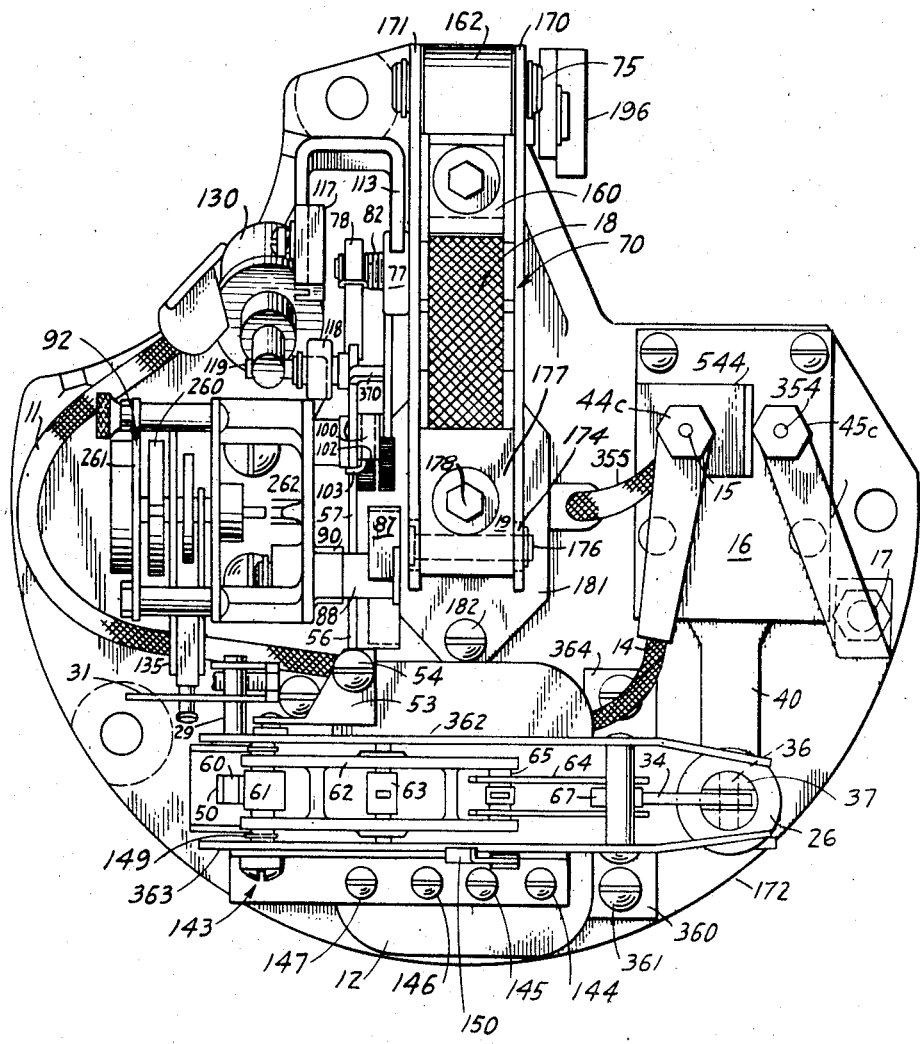
_Fig_6_
INVENTOR.
GEORGE A. MATTHEWS
BY Ostrolenk + Faber
ATTORNEY Sept. 9, 1958    G. A. MATTHEWS    2,851,567
AUTOMATIC RECLOSER
Original Filed Aug. 31, 1949    7 Sheets-Sheet 7
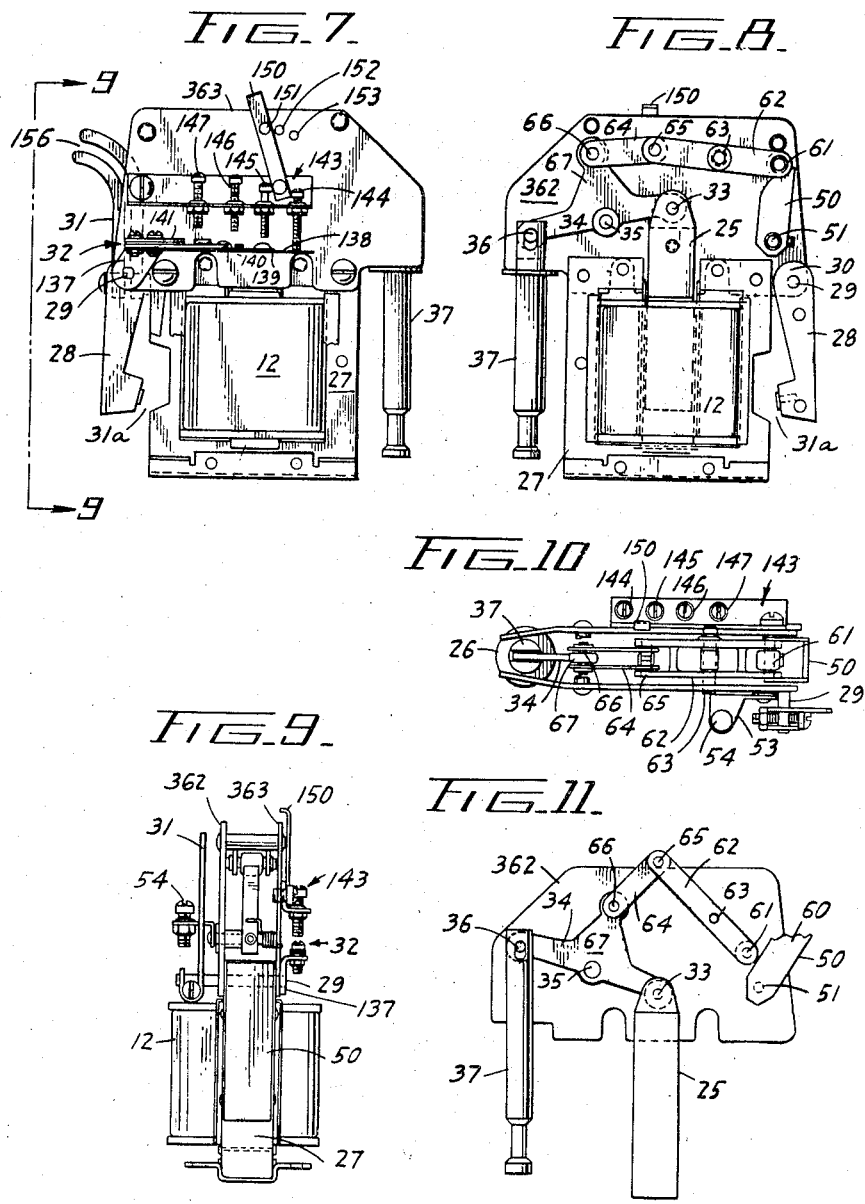
INVENTOR.
GEORGE A. MATTHEWS
BY Ostrolenk & Faber
ATTORNEY

United States Patent Office 2,851,567
Patented Sept. 9, 1958

2,851,567

AUTOMATIC RECLOSER

George A. Matthews, Detroit, Mich., assignor, by mesne assignments, to I-T-E Circuit Breaker Company, Philadelphia, Pa.

Original application August 31, 1949, Serial No. 113,371. Divided and this application October 12, 1953, Serial No. 396,962

1 Claim. (Cl. 200—109)

This invention pertains to a self-contained fault current powered and actuated circuit breaker of the type now known as a recloser. The invention is a new combination of mechanism forming a recloser that is an improvement over the forms of reclosers and interrupters disclosed in my earlier United States patent applications Serial Numbers 753,085, 751,511, 611,617, 439,576, and 522,120 which have issued respectively as Patents 2,118,355, 2,167,665, Re. 22,872, 2,443,260 and 2,487,025, respectively.

This application is a division of U. S. application Serial No. 113,371 filed August 31, 1949 and now U. S. Patent 2,738,394.

In this present invention I have retained the novel principles of operating characteristics as set forth in the earlier patents wherein with fault current flowing the first opening stroke is instantaneous, followed by a reclosing stroke, and all subsequent opening strokes are time delayed, finally to a locked open position if the fault is not cleared by the opening strokes, or a resetting to position for an instantaneous stroke if the fault is cleared by the opening strokes short of reaching the locked open position.

My new invention provides a recloser by which the overall time duration of fault current will not exceed 1¼ to 1½ cycles (60 cycle system) when the fault current exceeds 8½ times the continuous rating of the recloser. At this speed I have reduced the overall time of fault duration to 60% of that obtainable in the reclosers disclosed in my Patents 2,443,260 and 2,487,025. This reduction in time for fault duration has its advantage in that an overhead conductor is damaged to a lesser degree by the fault are for the shorter duration. By referring to Figure 1 of my Patent Re. 22,872 and using No. 6 wire, for example, because it is the most generally used wire size for laterals, it is noted that this size conductor will burn off in 2½ cycles with a 1375 ampere arcing fault, whereas at 1½ cycles 2375 amperes are required to burn it apart at the arcing fault. For current values less than the above, which will not burn the conductor apart, the damage to the conductor is very substantially reduced due to the reduced duration of the arc.

This invention provides a recloser wherein the elapsed time between the initial opening stroke and the closing stroke can be accurately adjusted to suit the characteristics of the circuit to which it will be applied.

This invention further provides a recloser in which the mechanism is adjustable to afford inverse time delay or definite time delay characteristic to the opening strokes after the initial instantaneous opening stroke, if on the initial closing stroke the fault current re-establishes as the result of the initial fault.

This invention also provides a mechanism in a recloser which can be adjusted and calibrated to regulate the time interval during which the fault current flows in the recloser, thereby satisfying the time-current tolerances necessary for proper coordination of reclosers with fuses and other protective devices generally operated in conjunction with reclosers. The use of the improved timing regulation for better coordination enhances the use of fuses in laterals, and the use of the smaller fuses, made possible by the improved regulation, will provide more reliable protection and performance. In this invention I am disclosing the time regulating mechanism.

My new invention also provides a recloser combination in which the main operating coil is not energized until the magnitude of the fault current is great enough to provide a full interrupting stroke for the interrupting contacts. This combination also provides for the elimination of contact "chattering" when the minimum value of operating current is approximated but not quite reached.

In order to provide the greatest economy in design and application, the recloser is spring operated to circuit closing position and operated to open position by an operating magnet energized by the fault current. The present recloser is, therefore, automatic and self-contained. The control elements are energized at circuit potential, thereby saving the cost of insulating the control from the line potential. If external low voltage control were used, it would be necessary to insulate the low control voltage from the elements of the recloser which are energized at the high potential of the line. Such insulation problems are, therefore, fully met by my invention wherein this insulation problem does not exist.

My recloser is fault current powered because as such it does not require external power for its operation. This results in the installed cost being considerably less than that for switchgear which requires external power for operation. The reclosers being self-contained also saves the cost and installation of external relays for controlling operation of the switchgear.

The power requirements of such an operating magnet, mentioned above, to operate the spring biased contacts of a relatively large circuit breaker are quite substantial and accordingly the operating magnet must be quite large. It is, therefore, not practical to maintain the operating magnet connected continuously in the power circuit due to the power loss of normal current flow therethrough. The operating magnet is, therefore, normally by-passed by contacts which are operated to disengaged position by an armature of a control magnet connected in series with the operating magnet as shown in Patent No. 2,443,260 and application Serial No. 522,120 now U. S. Patent 2,487,025. The losses in the low-loss control magnet are easily dissipated to maintain operating temperatures in keeping with established limits. The by-pass control also makes it possible to produce reclosers of greater current carrying capacity than that possible without the by-pass control. This provision, therefore, permits production of reclosers in the larger power classification of switchgear suitable of either indoors or outdoor station mounting.

Inasmuch as full load currents and even momentary fault currents may flow over the by-pass contacts, these contacts themselves are relatively large. The control of the operating coil by by-pass contacts makes it possible to utilize a low-base control coil in series with the main contacts.

Accordingly, an object of the present invention is to provide a novel control magnet construction for controlling the by-pass circuit around the operating magnet.

In operation, the recloser opens instantaneously and recloses after a predetermined time delay sufficient to permit a transient fault condition to cure itself.

In accordance with the present invention, the recloser, following disengagement of the contacts in response to a fault, is latched open. A time delay mechanism is then set into operation to release the latch after a predetermined interval following disengagement of the contacts to permit re-engagement by the closing spring.

In order to vary the timing control of the time control mechanism, a second armature is provided on the control magnet and is loosely coupled thereto magnetically. The second armature moves through a variable angle in accordance with the current value of the fault current flowing in the control magnet. This variable angular movement of the armature is achieved by providing a plurality of spring pressed stops for the armature, each at a different angle and presenting individual spring forces against movement of the armature. These stops are adjustable to provide control for shaping the time current to suit co-ordination requirements.

The variable angular movement of the armature in turn controls an adjustment of the time control mechanism to vary its timing control in accordance with the angular movement of the armature.

Accordingly, a further object of the invention is to provide a novel time delay control which is variably operated in accordance with the extent of the fault current.

Still another object of the invention is to provide a control magnet having an armature operated through variable distances in accordance with the fault current.

Another object of the invention is to provide a time control mechanism variably controlled by the control magnet.

Still a further object of the invention is to provide a novel control magnet having a first armature for controlling a by-pass circuit for an operating magnet and a second armature variably operated in accordance with a fault current for controlling a timing mechanism, which controls the latch.

Inasmuch as the recloser is magnetically operated open and spring operated closed and time delay for both reclosing and reopening the recloser is desired, a time delay mechanism which delays the spring closing operation and electromagnet reopening operation is desired.

To this end, the recloser is latched open following an opening operation and the time delay mechanism controls the time of release of the latch to permit spring operated reclosing of the contacts. The armature of the control magnet is now latched against operation in response to the energization of the magnet by fault currents in the line. The time delay mechanism operates to release only the latch after a predetermined interval to permit operation of the armature of the control magnet, in response to the fault current, which in turn removes the by-pass around the operating magnet.

During initial conditions the latch is only partially in engagement. This has the effect of predetermining the fault current value to which the control magnet will respond to move its armature instantaneously for opening the by-pass around the operating magnet. In subsequent operations the latch is fully set and achieves a time delay for the same fault current value. To simplify that, when the latch is only partially engaged the forces are such as to enable the armature to respond instantaneously when the fault current occurs; when the latch is fully set then no matter what the fault current the armature cannot move until the time delay has permitted it.

Thus, while high speed closing by spring means and high speed opening by electromagnetic means is obtained, time delay in the release of these respective sources of operating energy is achieved by latching each of these elements for variable periods.

Therefore, an object of the present invention is to provide a novel recloser in which the contacts are latched out of engagement and the control magnet armature is latched against operation in response to energization of the control magnet.

A further object is to provide a novel recloser in which the contacts are latched out of engagement and the control magnet armature is latched against operation in response to energization of the magnet and in which a time delay mechanism releases the latch on the contacts and on the armature.

Still another object is to provide a novel control magnet for the operating magnet having an armature with a latch for preventing operation of the armature when the magnet is energized.

The degrees of energization of the control coil is, of course, dependent upon the current value in the circuit. The control coil may be adjusted by an appropriate pick-up calibrating screw so that it will attract the armature which operates the control switch at and above a predetermined current value. The pick-up calibrating adjustment screw simply calibrates a latch for this purpose, which latch does not offer a time delay but will yield at a predetermined energy level to permit instantaneous opening, the speed of which is determined only by the inertia of the parts to be moved.

As heretofore stated, the recloser is essentially a circuit breaker which opens and recloses several times. If the fault has not been cleared during the first opening operation, further trips and reclosures occur at definite intervals until the circuit remains energized or until the recloser locks open.

The first tripping operation of any series is always instantaneous (from ½ to 2½ cycles depending on the current magnitude), while subsequent trips occur after either an inverse or definite time delay depending on the setting of the timer mechanism included in the apparatus.

The first reclosing time is normally 30 cycles but a slower reclosing time of 5 seconds can be obtained by simple adjustment. Likewise, in circuits where fast reclosure is desired, the reclosing time on the first reclosure can be made as short as 6 cycles. The time delay on subsequent reclosures is preferably of the order of 5 seconds.

If, following a predetermined number of operations, the fault has not cleared, the recloser should be locked open. To this end a novel lock-out is provided which stops operation of the timing mechanism and prevents release of the principal latch after a predetermined number of operations. In such a case it is desirable to provide manual means which releases the latch to permit reclosing of the recloser when the fault condition has been corrected. It is further desirable to provide interlocking means to cause the lock-out to be inoperable when the breaker is in the closed position.

When the breaker is moving to locked-out position and during the reclosing timing interval, the timer arm is prevented from moving by a suitable lock-out ratchet. This interference prevents release of a closing latch. By external movement of suitable linkage the main operating arm is forced to the maximum open position. This movement releases a timer arm interference and allows the breaker to reset.

Simplicity and economy of design is achieved by providing four functions to the timer. Namely, means for segregating instantaneous and time-delay operations, a control time for opening and for reclosing and integrating the time for lock-out. A pin controls the pawl on the lock-out hereinafter described so that it is impossible for the breaker to lock-out with the circuit breaker contacts closed. Lock-out can only be achieved with the circuit breaker contacts in the open position, and this is accomplished in the present construction by a positive operation as noted above. It is possible in other devices, if there is an accidental missing on the ratchet teeth, to achieve a lock-out condition when the contacts are closed.

In order to utilize the same timer for both time-delayed reclosures and locking out, the shaft of the timing mechanism is provided with two circular ratchets. A timer arm is provided and is connected by a pawl to the reclosing time delay circular ratchet.

After the first breaker opening and on the closing stroke, the timer arm, hereinafter described, attempts to contact one of the teeth on the time delay ratchet, but on the first reclosure there are no teeth on the ratchet in a position to be engaged by the timer arm; the pawl and timer arm accordingly slide down releasing the principal latch to permit the main contacts of the recloser to re-engage. After the release of the principal latch, the pawl engages a tooth on the ratchet and the remaining portion of the stroke is thereafter controlled by the time delay mechanism; the control magnet armature cannot operate its armature to open the by-pass circuit until the pawl and timer arm complete their downward movement. The timing mechanism thereafter controls the speed of return or reset of the ratchet.

If a fault still persists, then the recloser will again open before the ratchet has had time to return to its original position and the pawl on the timer arm will now engage a tooth on the ratchet, thereby rotating the ratchet under the control of the time delay mechanism during the full downward stroke of the timer arm and pawl. Since the first portion of the downward stroke controls the release of the principal latch, this release will take place only after a time delay; so that the reclosing of the main contacts after the second opening will take place only after this time delay. After release of the principal latch, the pawl and timer arm as in the case of the first reclosure are still under the control of the ratchet to time delay the release of the control armature. This last portion of the time delay is controlled as to speed in accordance with the magnitude of the fault or overload current, means being provided to speed up the operation of the timing mechanism in accordance with the intensity of the overload.

The resetting of the time delay, however, is always under the control of the timing mechanism, and this resetting is not speeded up at any time in resetting. Therefore, if a number of successive openings occur within a predetermined time, the ratchet mechanism will be rotated to a lock-out position, but if the breaker remains closed a time interval, greater than the predetermined interval, the timer resets to inoperative condition for instantaneous opening.

The reclosures occur a number of times until the second ratchet is rotated to a lock-out position which prevents reclosing. The second ratchet is smooth over the portion of its circumference initially in contact with a lock-out pawl and is provided with teeth over a relatively small section thereof. The lock-out pawl on the principal latch is arranged to engage the perimeter of the second ratchet.

The lock-out pawl is interlocked with the principal operating arm to preclude lock-out condition of the control when the main contacts are closed. A rigid pin on the principal operating arm holds the lock-out pawl out of registry with the lock-out ratchet at all times that the main contacts are engaged.

After a predetermined number of operations, the teeth of the second ratchet move into registry with the pawl so that on the next opening operation the pawl will be engaged by the teeth and the principal latch will be prevented from operating, thereby resulting in a locking open of the circuit breaker.

If desired, time delay on the first reclosing is avoided by omitting the teeth on the reclosing time delay ratchet at the position it would occupy at the first opening operation.

Appropriate operating mechanism for releasing the circuit breaker from its locked out position is provided accessible from outside of the circuit breaker housing together with suitable means for manually opening the circuit breaker at any time and locking it open.

The novel structure comprises a vertically arranged oil filled casing with stationary power interrupter contacts at the lower end thereof and a vertically movable plunger carrying an appropriate movable contact engageable with the stationary power interrupting contacts and operable in an arc interrupting chamber comprising a plurality of perforated lamina of insulating fibrous material, the aligned perforations forming a cylindrical chamber. The diameter of the movable plunger contacts and insulation secured to and movable with the plunger is substantially equal to the diameter of the aligned perforation, the slight decrease in diameter of the movable member with respect to the arc chamber making allowance being just sufficient for mechanical tolerances, such as normal expansion and contraction to permit unobstructed and free movement of the movable contact.

Another object of the invention is the provision of a novel control coil and associated armatures for switchgear.

Another object of the invention is the provision of novel timing elements for controlling the operation of switchgear.

The foregoing and many other objects of this invention will become apparent in the following description and drawings in which:

Figure 2a is a view in perspective corresponding to that of Figure 2 showing the elements of Figure 2 connected together in order to show the relationship of the various parts.

Figure 6 is a top view of the control elements of Figure 4.

Figure 7 is a side view of the control coil and its associated armatures taken from line 15—15 of Figure 4 looking in the direction of the arrows.

Figure 8 is a view of the opposite side of the control coil and its associated armatures.

Figure 9 is a view of the control coil taken from line 17—17 of Figure 7.

Figure 10 is a top view of the control coil and its associated armatures.

Figure 11 is a schematic view corresponding to that of Figure 8 but showing the trip position of the control coil.

*Ia. Circuit connections and general operation*

Figure 1:
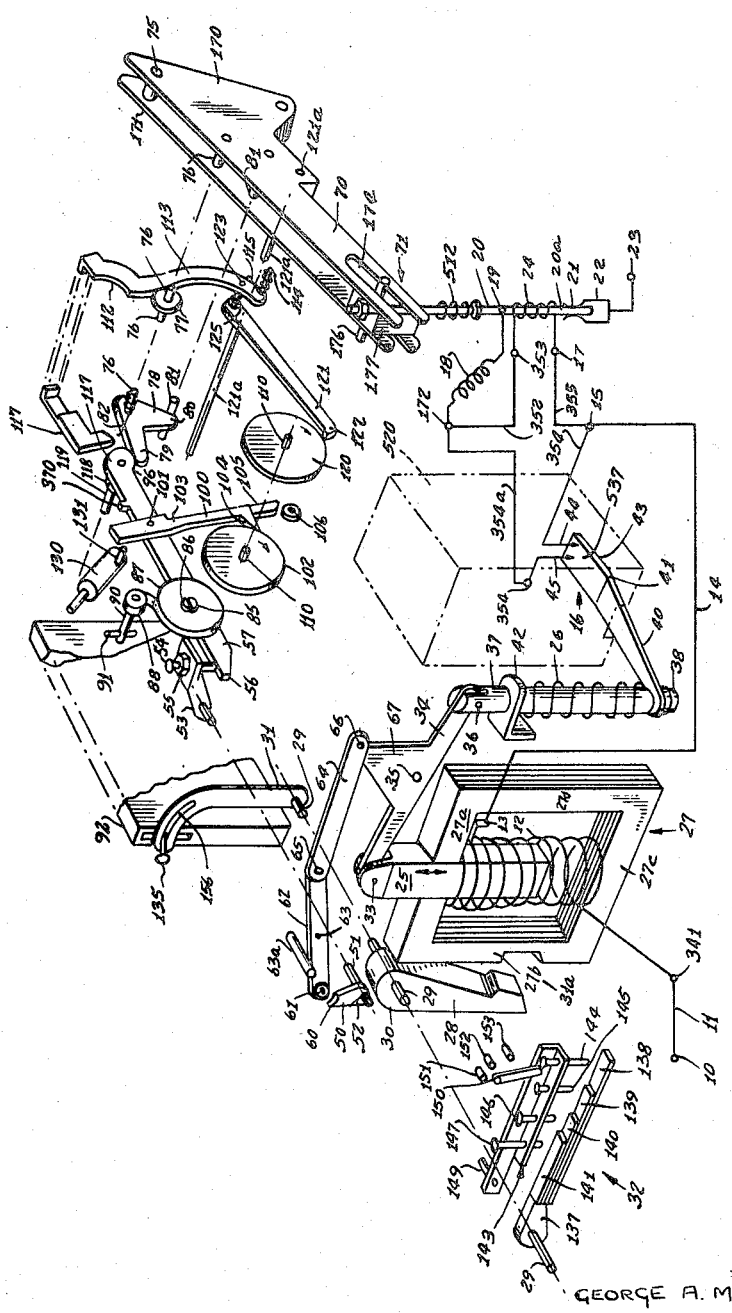
Figure 1 is an exploded schematic view in perspective of those operating elements of the novel automatic circuit recloser which are contained within the operating section of the housing of the circuit recloser.
Figure 2:
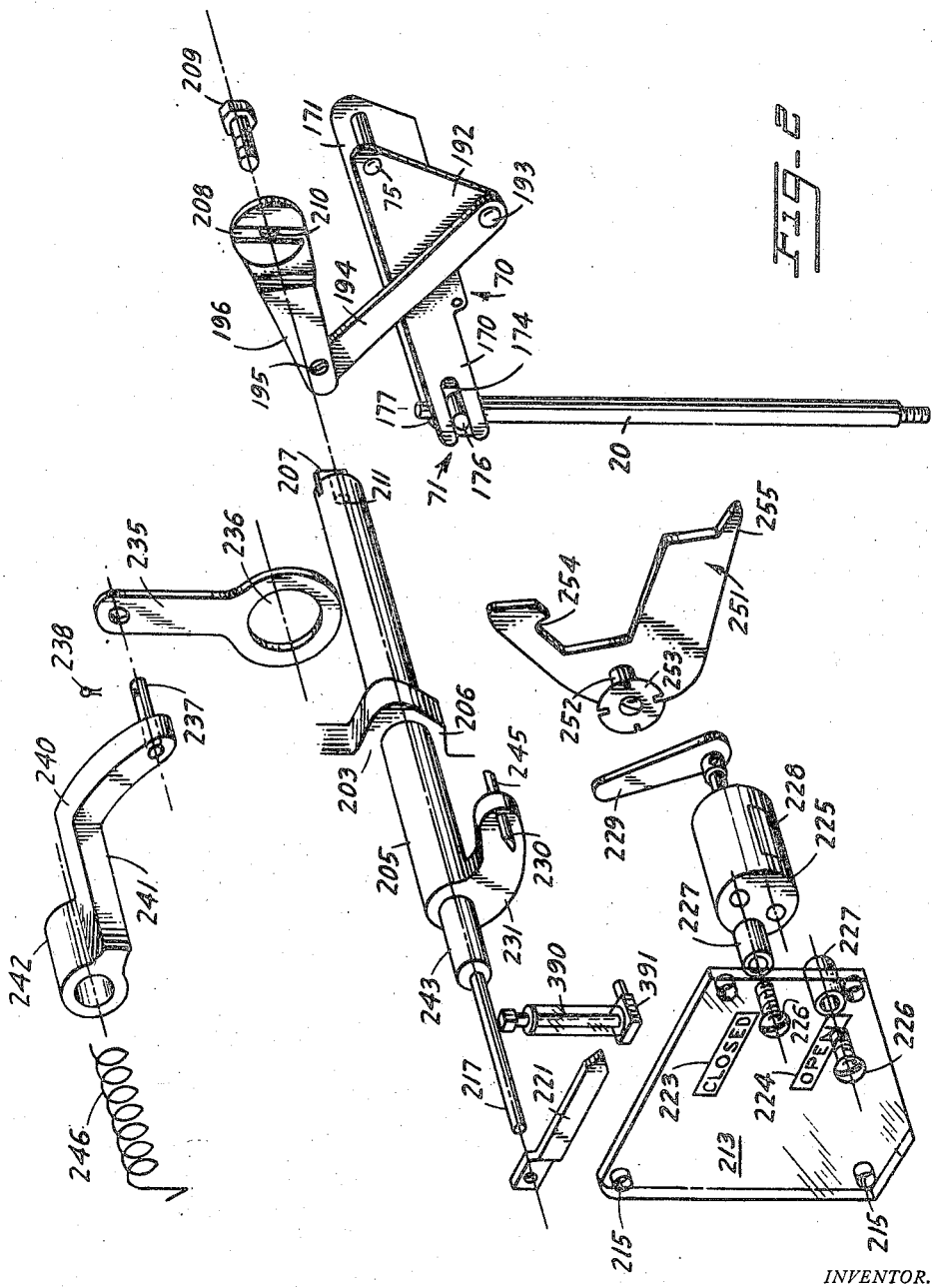
Figure 2 is a schematic view in perspective exploded in two directions of those operating and indicating elements of the novel circuit recloser which are contained outside the housing, and the directly connected elements on the inside of the housing.
Figure 3:
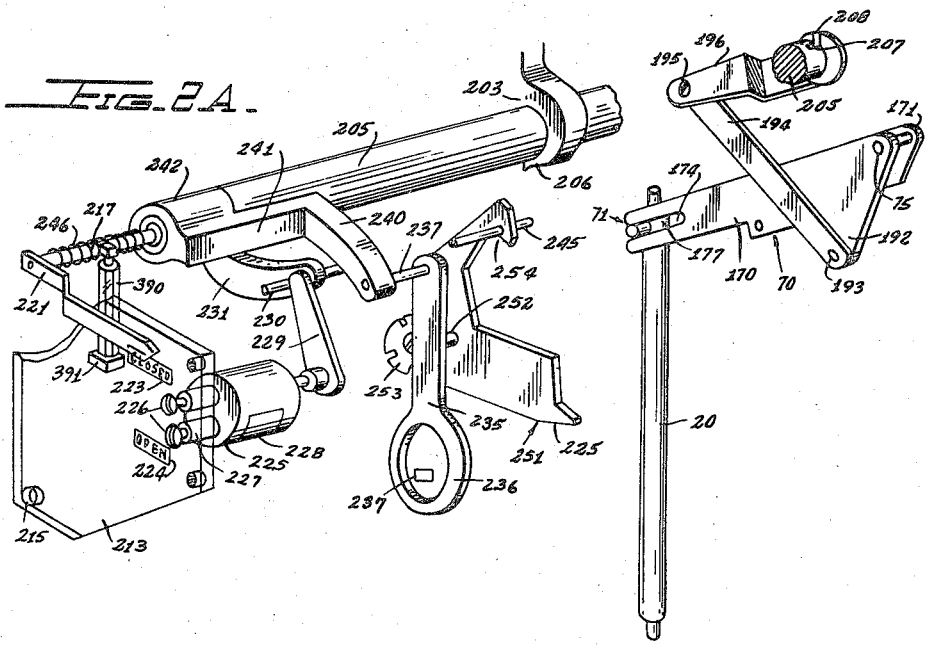
Figure 3 is a circuit diagram showing the circuit connections between the operating elements of the novel automatic circuit recloser.

During normal operations, the electrical elements of the recloser are connected in series with the power line at terminals 10, 23 which is to be protected by the recloser. This circuit extends from terminal 10, conductor 11, connector 341, through winding 12 of the control magnet conductors 14, connector 15, contacts 45 and 44 bridged by switch operating member 537, conductor 354A to connector 172 and lead 18, to rod 20, stationary contact 21, 22 to the power line terminal 23.

It will be noted that with contact 537 bridging the contacts 44, 45, the winding of operating magnet 24 is by-passed so that normally substantially no current flows through and, therefore, there is substantially no loss due to current flowing in this winding. However, the windings of control magnet 12 are connected in series with the power line and are, therefore, energized by line current. On predetermined energization of the control magnet 12, in response to a fault current in the power line, lever 40 which carries contact 537 is moved, as will hereinafter be described, to open the bridge across contacts 44, 45, thereby inserting the winding of operating magnet 24 in series with the winding of control magnet 12 and the power line.

Magnet 24 is now energized in response to the fault current to operate its rod 20 to contact disengaged position.

Following separation of the main contacts 21 and 20A, the arc which is formed on the opening of the circuit at that point is extinguished and results in de-energization of the operating coil 24. Thereupon the closing spring hereinafter described drives the plunger 20 down to re-establish current carrying connections between the main movable contact 20A and the main stationary contact 21.

The operating mechanism shown schematically in Figure 1 is designed to provide appropriate controls for circuit opening operations and for the reclosing operations, so that successive reclosing operations may take place with a desired time delay interval between them and so that the plunger 20 may be locked in the up or disengaged position after a predetermined number of reclosing operations.

Ib. Control coil and associated armatures

The control coil 12 is arranged so that in response to a fault current of predetermined value in the circuit which is protected control coil will be sufficiently energized to move solenoid armature 25 connected to the control switch 16 and thus to open the control switch.

The control coil 12, therefore, is the initial operating coil of the entire system. Control coil 12 is essentially a solenoid coil surrounding the armature 25 which is normally biased above the coil by compression spring 26 in the manner hereinafter described.

The armature 25 is preferably a laminated iron structure, a portion of which forms together with the laminated magnetic rectangular plates 27a and 27b and with 27d and 27c, magnetic paths for the flow of flux in response to energization of the control coil 12.

The magnetic path 27 includes the additional armature 28 which is secured to the rotatable shaft 29 so that portion 30 thereof is in engagement with the top leg 27b of the magnetic flux path.

For ordinary current values flowing through control coil 12, magnetic flux through the legs 27a, 27b, 27d and 27c of the magnet is not sufficient to attract the armature 28. However, where a predetermined current value is exceeded, i. e., a fault current flows in the line, section $27b_1$ of the leg 27b of the magnet becomes saturated and the resultant magnetic flux passing from leg 27b through the armature 28 and across the air gap 31a results in attraction of the armature 28 toward the magnet 27. This results in rotation of the shaft 29 and the curved timer adjustment fork 31 mounted on shaft 29.

Thus, the control coil 12 has two immediate functions when energized to a predetermined value in excess of normal current value: (1) it attracts the armature 25 against the bias of compression spring 26 and (2) it attracts the armature 28 against the bias of the spring assembly 32 of the armature 28, which spring assembly is also hereinafter described.

Ibi. Connection of control coil armature and toggles to control switch

The upper end of armature 25 is connected by pin 33 to the lever 34 which is pivotally mounted on the stationary pivot 35. The opposite end of the lever 34 is connected by pivot 36 to the connecting rod 37. The lower end of connecting rod 37 is connected by pin 38 to the control switch operating lever 40.

Control switch operating lever 40 is pivotally mounted on the pivot 41. Compression spring 26 compressed between the stationary collar 42 and the end of lever 40 at pivot 38 surrounds the connecting rod 37.

Compression spring 26 drives the lower end of connecting rod 37 and therefore the left-hand end of control switch lever 40 downwardly, thereby pulling down the right-hand end of lever 34, lifting up the left-hand end of lever 34 and exerting an upward initial bias on pin 33 and armature 25. Spring 26 by this means normally maintains the armature 25 in the raised position partly outside of the control coil 12 as shown in Figures 1 and 8.

The right-hand end of the control switch lever 40 is provided with the contact section 43 normally bridging the stationary contacts 44, 45 of the control switch 16 and being held in bridging engagement therewith by the compression spring 26 which drives the left-hand end of lever 40 down as previously described.

On energization of control coil 12 to a sufficient value, armature 25 is moved, rotating lever 34 in a counterclockwise direction around pivot 35 and raising the connecting rod 37 upwardly against the bias of compression spring 26.

This results in a clockwise rotation of lever 40 and the movement of the bridging contact 43 away from the stationary contacts 44 and 45 of the control switch 16.

Accordingly, the current value at which the control coil 12 will be energized sufficiently to attract the armature 25 may be determined by the compression of compression spring 26 and may if desired (but not preferably) be calibrated by making collar 42 adjustable.

The "drop out" characteristic of the control relay is important. It is desirable for reclosers to have this feature in order to protect the normally shunted operating coil from carrying load currents which would burn them out. In case that a fault clears from a line (such as by self-clearing or by the blowing of a distribution transformer primary fuse) before the power contacts have had time to open but after the control contacts have opened, the load current returns to normal.

Unless a high "drop out" value is afforded, the control armature stays in the fully attracted position by the load current, thereby holding the control contacts open. This causes the load current to pass through the operating coil which is normally shunted. The drop out value should be at least 80% of the full load rating. The present recloser provides suitable drop out by including a non-magnetic plate (Figure 7) which prevents the armature from sealing in against the magnetic pole face.

Ibii. Control coil calibration

However, a simpler and more accurate degree of adjustment is provided by the opening latch 50 keyed to and mounted on the rotatable pin 51, the opening latch 50 being spring biased in a clockwise direction with respect to Figure 1 toward latching position by the coil spring 52.

Pin or shaft 51 carries the lug 53 secured thereto and rotatable therewith, which lug carries at its outer end the pick-up calibrating screw 54 which is adjustably mounted in the lug 53 for upward and downward movement on rotation of the screw 54 and which may be locked in the adjusted position by the locknut 55.

The lower end of the pick-up calibrating screw 54 bears against the forward end 56 of the timer arm 57. The opening latch 50 is provided with the latching detent 60 so arranged that it provided a detent or ledge against which the roller 61 at the end of lever 62 may bear.

Lever 62 is pivotally mounted on the stationary pin 63. The end thereof opposite the roller 61 is in toggle relation with the link 64, being connected thereto by the knee pin 65. The opposite end of toggle 62—65—64 is connected by pin 66 to the upwardly extending arm 67 of the lever 34.

When, therefore, the armature 25 is attracted downwardly by energization of the control coil 12 to rotate the lever 34 in a counterclockwise direction, it not only must compress the spring 26 but also must operate against the holding force of the latch 50 so that the toggle 62—65—64 may collapse to the position shown in Figure 11.

The armature 25, therefore, cannot be pulled down by coil 12 unless the roller 61 bearing against the latching detent 60 displaces the opening latch 50 in a counterclockwise direction with respect to Figure 1 or in a clockwise direction with respect to Figure 11.

The pick-up calibrating screw 54 bearing against the forward end 56 of the timer arm 57 determined the angular position of the pin 51 and the opening latch 50 thereby determining the degree to which the latching detent 60 of the opening latch 50 underlies the roller 61 at the end of toggle 62—65—64. Pin 63A bearing on the top surface of lever 62 ensures that roller 61 will ride in latching detent 60.

The degree to which the detent 60 underlies the roller 61 determines the initial force required to displace the opening latch 50 in order to permit the armature 25 to be moved down by coil 12. The greater the displacement of the opening latch 50 in a counterclockwise direction (with respect to Figure 1) the less force required to push the roller 61 off the latching detent 60 to rotate the opening latch 50 from the position of Figure 8 to the position of Figure 11.

The greater the adjustment of the latch 50 in a counterclockwise direction with respect to Figures 8 and 11 the greater the force required for this displacement.

Accordingly, the adjustment of pick-up calibrating screw 54 which determines this initial angular displacement of the opening latch 50 determines the force and hence the over current condition required before initiation of operation of the apparatus.

When, however, this displacing force is reached, armature 25 is pulled down by control coil 12; roller 61 of toggle 62—65—64 rolls off the latching detent 60 and against the side of the opening latch 50; the opening latch 50 is rotated in a clockwise direction to the position of Figure 11 while toggle 62—65—64 collapses to the position of Figure 11; the connecting rod 37 is raised; switch operating lever 40 is rotated, and bridging contact 43 moves out of engagement with the stationary contacts 44 and 45 of the control switch 16.

With the control switch 16 thus opened, the full current passes through the operating coil 24 which attracts the plunger 20, pulling it upwardly and separating the main movable contact 21 from the main stationary contact 22 to open the circuit.

The upper end of the plunger 20 is connected to the operating arm 70 by the yoke connection 71 in such manner that the upward movement of plunger 20 must necessarily result in upward rotation of operating arm 70 and downward movement of the plunger 20 must necessarily result in downward rotation of the operating arm 70 and vice versa.

Ic. Timer arm and associated latches and time delay ratchets

The structure of the operating arm 70 will be more fully understood in connection with the description of Figures 1, 2, 4, 6. For purposes, however, of review of the entire operation, it is sufficient to point out for the present that operating arm 70 is rotatably mounted on the stationary pivot 75 at the end opposite its connection at 71 to plunger 20.

Operating arm 70 carries intermediate its ends and extending transversely with respect thereto the pin 76 on which are rotatably mounted the main latch roller 77 and the pawl 78. Pawl 78 is essentially a bell crank lever in form having a timer arm engaging leg 79 for engagement with arm 57 in the manner hereinafter described and a downwardly extending positioning leg 80.

In the normal at rest position of the operating arm 70, shown schematically in Figure 20, the positioning leg 80 of pawl 78 is driven by coil spring 82 against the stop pin 81 carried by the operating arm 70.

Figure 4:
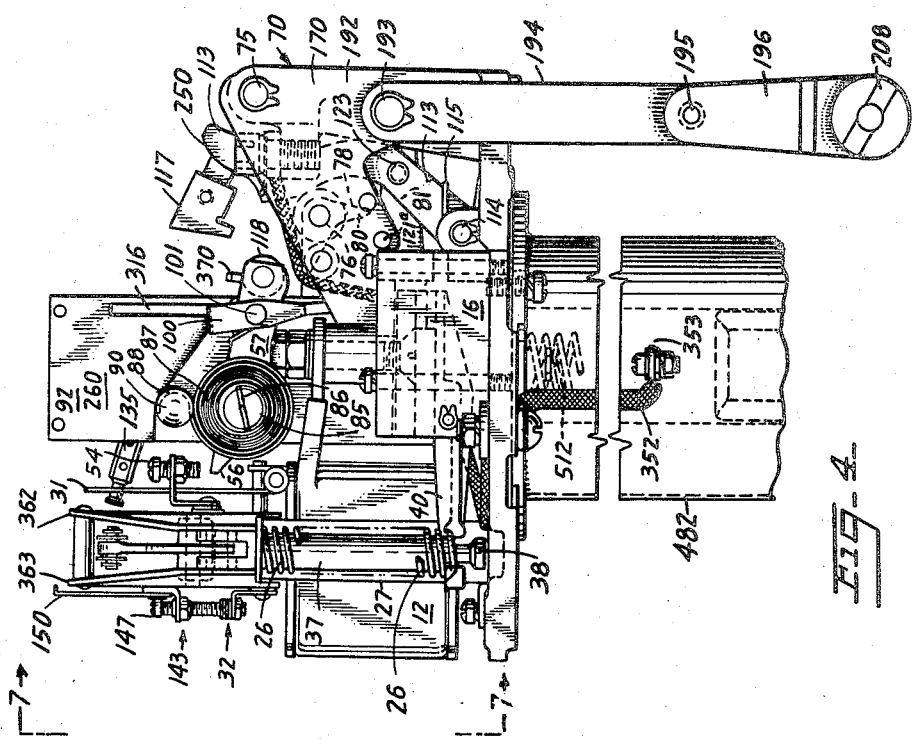
Figure 4 is a side view of the control elements shown schematically in Figure 1 contained in the control housing with the exterior operating elements of Figure 2 omitted.
Figure 5:
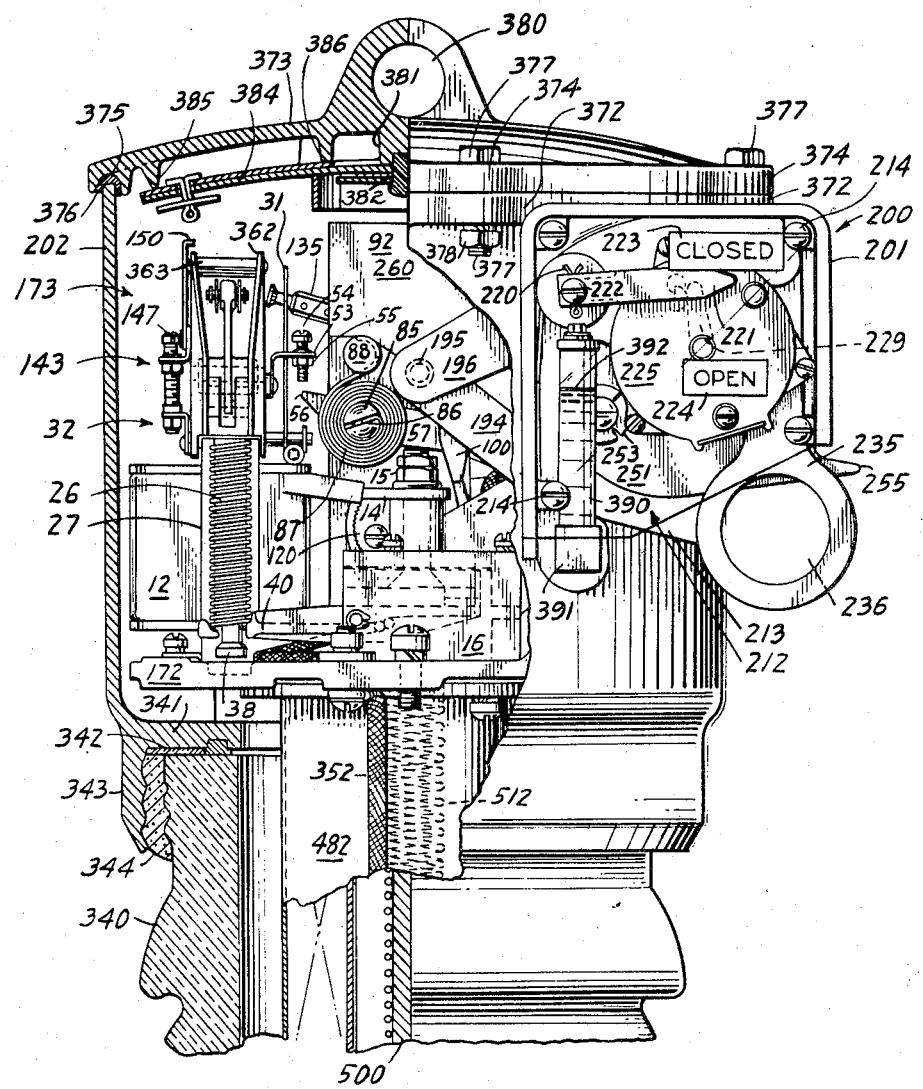
Figure 5 is a view corresponding to that of Figure 7 with the exterior operating elements of Figures 2 and 2a included.

The timer arm 57 as is shown in Figures 1 and 4 is provided with a slotted pin 85 receiving the end 86 of coil spring 87. Coil spring 87 is wound around the slotted pin 85 and the outer end 88 thereof is connected to the stationary pin 90 carried (see Figures 1, 4, and 6) in the lug 91 (not shown) extending from the side of the timing mechanism housing 92.

Coil spring 87 is so adjusted that the timer arm 57 in the normal closed circuit position of the apparatus is substantially horizontal. When the timer arm 57 is rotated in a counterclockwise direction with respect to Figures 1 and 4, the coil spring 87 is tensioned tending to rotate the timer arm 57 back toward the substantially horizontal position.

Timer arm 57 has a rearward extension 95 with a rounded under surface 96 which will be engaged by the upper surface of leg 79 of pawl 78 when the operating arm 70 begins to rise during the upward movement of the plunger 20.

Thus, as the operating arm 70 rises, the pawl 78 lifts the rear end 95 of the timer arm 57 rotating the timer arm as above described and thereby lifting the time delay pawl lever 100 which is connected by the pin 101 to the timer arm 57 between the pin 85 and the end 95 of the timer arm 57.

Time delay pawl lever 100 is biased in a clockwise direction toward the time delay toothed ratchet 102 by the coil spring 103. Time delay pawl lever 100 is provided with the pawl tooth 104 which bears against the time delay circular ratchet 102.

Lever 100 also is provided with the extension 105 below the pawl tooth 104 having a cammed surface which bears against the pin 106 carried by the housing 92 of the timer mechanism and which in the normal at rest position of the operating mechanism with the switch contacts closed maintains the pawl tooth 104 out of engagement with the surface of the time delay ratchet 102.

Pin 106 is rotatable and is cam-shaped to provide adjustment of the disengaging point of pawl 100.

When, however, the operating arm 70 is raised about its pivot 75 owing to the lifting up of the plunger 20 by the operating solenoid coil 24 and pawl 78 thus lifts the end 95 of the timer arm 57, the time delay pawl lever 100 is lifted; and as soon as its extension 105 clears the pin 106, coil spring 103 drives the pawl tooth 104 against the surface of the time delay ratchet 102.

The pawl tooth 104 of the time delay pawl lever 100 rides up the surface of the time delay ratchet 102 without rotating the same owing to the curvature of the teeth 107 of the ratchet 102 and also owing to the fact that certain portions 108, 109 may be made smooth and without the teeth 107 for purposes hereinafter more specifically described.

The dashpot unit 130 pivotally mounted on pin 131 and connected to pin 119 of timer arm 57 may provide a time delay on the first reclosure of about thirty cycles rather than the six cycles which may be obtained without the dashpot unit. The reason that the device would operate so fast (six cycles) without the dashpot is that the timer does not function at all on the first reclosure because of the flat spot on the time delay ratchet 102, as described previously. The dashpot is utilized where it is desired to increase this time delay from six to thirty cycles.

By adjusting stop 330 (Figure 34) by means of screw 332, it is possible to relocate the normal or reset portion of the timer and, therefore, the time delay ratchet 102. If this is done, the flat spot is moved in a counterclockwise direction (Figure 39) as shown in Figure 38, and then the detent 104 engages with a tooth and thus provides the full five seconds delay on the first reclosure due to the influence of the timer.

Ici. Inverse time delay on reopening

When the contacts 21—22 open, on the lifting of the plunger and operating arm 70, then, as stated hereinbefore, the control coil 12 is de-energized and spring 26 returns the control switch 16 and the control armature 25 back to their original positions with the control unit returning from the position of Figure 11 back to the position of Figure 8. Owing to the fact that the end 95 of the timer arm 57 is raised, the forward end 56 of the timer arm 57 is lowered and thus it moves away from the pick-up calibrating screw 54.

Consequently, coil spring 52 may now drive the opening latch 50 to a position where its detent 60 locks under the roller 61 of toggle 62—65—64. The latching detent 60 owing to the fact that the pick-up calibrating screw 54 at this point has nothing to rest on because of the lowering of end 56 of the timer arm 57 moves sufficiently under the roller 61 so that it absolutely locks the roller 61 and so that the roller 61 cannot push the opening latch 50 out for a tripping operation.

Energization of control coil 12 after closing of contacts 21—22 by descent of plunger 20 after release of latch roller 77 cannot now pull down the armature 25 to reopen the control switch 16 until the timer arm 57 completes its full return to its original position.

At this time, thereby permitting the reopening time delay hereinafter described to be effective, the end 56 of the timer arm 57 lifts the pick-up calibrating screw 54 to rotate lug 53, pin 51, and latch 50 back to the calibrated position at which the control coil, if properly energized, will pull down the armature 25 with sufficient force to cause the roller 61 to push the latch 50 aside.

As previously pointed out, after the timer arm 57 in its return movement under the control of the time delay ratchet 102 causes the latch 113 to release the main latch roller 77, the closing spring hereinafter described closes contacts 21 and 22 to re-establish the flow of current through the automatic recloser.

At this time, the switch 16 has been closed establishing a by-pass for the operating coil 24 and, therefore, the contacts remain closed. This reclosing of the circuit breakers occurs before the end 56 of the timer arm 57 has reached the pick-up calibrating screw 54.

Accordingly, the latch 50 and its detent are so located under the roller 61 at this point that the control coil 12 cannot pull down the armature 25 to open control switch 61.

With the latch 50, therefore, locking the roller 61, the circuit breaker cannot at this time trip after the first reclosing operation even through a fault current may exist which would normally have energized coil 12 sufficiently to attract the armature 25 and open the switch 16. Such attraction of the armature 25 to open the switch 16 cannot occur until the end 56 of the timer arm 57 lifts the pick-up calibrating screw 54 to rotate the latch 50 to a position where the roller 61 may push it aside to permit collapse of toggle 62—65—64 and thereby permit the attraction of the armature 25 and opening of switch 16.

The timer arm 57 completes its movement to a point where it lifts up the pick-up calibrating screw 54 after a time delay, which varies inversely with the magnitude of the short circuit current. That is, for relatively light over-load currents, the time delay may be as much as several seconds, whereas for heavy short circuit currents, the time delay may be very short, for example .25 second.

From the above, it will now be clear that the present invention provides time delay for each reclosing operation and for each opening operation following the first instantaneous opening operation.

The time delay is adjustably variable for coordination with fuses and relay controlled breakers or other reclosers any or all of which may be in series in the circuit.

Both time delays are achieved with the same timing mechanism and with individual latches.

Inasmuch as reclosing is by spring operation, a first latch 112 locks the contacts in disengaged position. The time delay after a predetermined interval releases this first latch to permit fast spring reclosure of the contacts.

Since reopening is by magnet operation, a second latch 60 locks the armature of the control magnet which in turn controls the energizing circuit of the operating magnet. The time delay after a predetermined interval releases a second latch to effect energization of the operating magnet resulting in fast magnet opening of the contacts.

Although the latter latch is on the armature of the control magnet, which is preferable because the toggle 62—65—64 permits a light latch 60 to lock against a strong pull, the net effect is to lock plunger 20 against movement. Accordingly, the latch can be located anywhere in the mechanical or electrical system which controls movement of plunger 20 including a latch on plunger 20, it being understood that release of the latch would be controlled by the time delay mechanism.

Both the reclosing and reopening time delays are provided to automatically give the circuit time to correct the fault conditions if they can be corrected.

Under short circuit conditions, however, it becomes desirable to hasten the operation of the timer arm 57 from the point where reclosing occurs to the point where it engages the pick-up calibrating screw 54 to permit a tripping operation to occur again.

For this purpose, the additional armature 28 is an inverse time delay armature restrained by its composite spring 32 but which when attracted will operate the fork 31 to adjust the timer adjustment arm 135 for more rapid operation of the timer 92, for coordination with fuses, relay controlled breakers or other reclosers.

The shaft 29 which carries the inverse time delay armature and the adjusting fork 31 carries at its outer end the spring bracket 137 which in turn carries the four or sufficient number of leaf springs 138, 139, 140, 141 comprising the composite spring 32. These springs extend parallel to each other and in surface to surface engagement beneath the angle stop bracket 143 carrying the adjustable stops 144, 145, 146, 147.

Stop 144 is arranged so that it will only engage leaf spring 138. Thus, on relatively low current values attracting the armature 28, leaf spring 138 engaging against stop 144 will halt the armature. On higher current values leaf springs 138 and 139 engaging stops 144 and 145 will halt the armature. On still higher current values leaf springs 138, 139, and 140 engaging stops 144, 145 and 146 will halt the armature, and in so doing regulate the interval of time suitable for coordination with other devices.

On further increased current values, all the leaf springs 138 to 141 engaging the stops 144, 145, 146 and 147 will halt the armature 28. On short circuit currents, all of the springs will give to permit full attraction of the armature 28.

The stop positions after they have been set may be adjusted by making the angle bracket 143 rotatable on the pin 149 by securing to the opposite end and adjustment lever 150 movable to three positions, 151, 152, 153, at which it may be engaged.

As the inverse time armature 28 is pulled inwardly toward the magnet 27, it rotates the adjustment fork 31 in the opposite direction as will be obvious from an inspection of Figure 1, and the curved slot 156 of adjustment fork 31 receiving the timer adjustment arm 135 will move the timer adjustment arm 135 downwardly.

The timing mechanism in housing 92 is so arranged that as the timer adjustment arm 135 is moved downwardly, the ratchets 102, 120 and timer shaft 110 may rotate more freely and when it is moved down all the way, the ratchets 102, 120 and the timer shaft 110 rotate substantially free of any time delay.

Thus, if after the contacts reclose normal current prevails, the timing arm 57 will continue to complete its movement under the time delay afforded by mechanical timer controlled ratchet 102 as determined by the full time delay available in the timing mechanism in housing 92; and on completion of its movement, the timing arm 57 will lift the pick-up calibrating screw 54 to unlock armature 25 in the manner previously described, thus making it again instantaneous on subsequent over-current.

If, however, an overcurrent condition still exists, the inverse time armature 28 will be attracted to an angular position as determined by the resistance offered by the composite spring 32, the said angular position being a function of the degree of overcurrent.

This attraction will result in rotation of the adjustment fork 31 so that its slot 156 will pull down the timer adjustment arm 135 also to a degree which is a function of the overcurrent condition.

The ratchet 102 and the timer shaft 110 will then rotate more rapidly under the influence of coil spring 87 of timer arm 57 to permit more rapid return of the timer arm 57 to a position where its end 56 lifts the calibrating screw 54 to unlock the control relay 12.

Under high magnitude short circuit conditions, the inverse time delay armature 28 will be attracted to its full extent and the adjustment fork 31 will be rotated to pull down the timer adjustment arm 135 to its full extent to substantially remove the time delay from the timer arm so that the timer arm may move almost instantaneously from the position where it has permitted reclosure to occur to a position where it lifts the pick-up calibrating screw 54, thereby unlocking the control relay armature 25 to permit it to operate once more to cause the automatic reclosure to trip open.

Thus, the inverse time delay for the opening of the automatic recloser is controlled by the timing mechanism in housing 92 in that the movement of the timer arm between the position where it has permitted reclosure to occur and the position where it unlocks the relay armature 25 by lifting the calibrating screw 54 is under the control of the same time delay mechanism as controls the reclosing time delay.

As previously pointed out, however, the reclosing time delay operates through one, two, or three or more cycles to a lock-out position by depending on cumulative rotation of shaft 110 carrying ratchets 102 and 120 in the same direction.

The inverse time armature 28, adjustment fork 31 and timer adjustment arm 135 simply operate to permit more rapid movement of the timer shaft 110 in the same direction. The timer arm still operates the time delay mechanism through its full cycle for any reclosing operation, except that the last portion of the cycle after reclosing has occurred and before unlocking of the relay armature 25 may be adjusted as to time to occur more or less rapidly depending on the intensity of the overcurrent condition. Greater choice of coordination is thereby provided.

Consequently, this variation or adjustment of the time delay mechanism does not interfere with the cumulative angular rotation of timer shaft 110 which is measured to determine the number of reclosings which will occur in a single series before a lock-out is reached.

Thus, the novel automatic recloser will operate so that the first opening operation is not subject to a time delay. The first reclosing operation may or may not, depending on the adjustments, be subject to a time delay.

The adjusting fork 31 is always engaged with the timer adjustment arm 135. If the timer adjustment arm 135 is not locked in position, then the second opening operation is subject to an inverse time delay due to the action of armature 28. If the timer adjustment arm 135 is locked in position by the insertion of tip 321 of adjusting screw 320 (Figure 35) in the slot 322 of timer adjustment arm 135, the second opening operation will be at a constant time delay irrespective of the magnitude of short circuit current since the armature 28 and adjusting fork 31 Figure 1 cannot cause any movement of the timer adjustment arm.

The second and subsequent reclosing operations are subject to time delay and subsequent reopenings are subject to the same time delay which may have inverse characteristics as the second opening operation.

In the foregoing I have described my invention solely in connection with specific illustrative embodiments thereof. Since many variations and modifications of my invention will now be obvious to those skilled in the art, I prefer to be bound not by the specific disclosures herein contained but only by the appended claim.

I claim:

In an automatic recloser, a control magnet and an armature mechanism having an operated and non-operated position; biasing means for biasing said armature mechanism to its said non-operated position; means for controlling and adjusting the current value response of said control magnet including a latch for restraining said armature mechanism in its non-operated position and a pick-up calibrating screw; said armature mechanism comprising an armature and a toggle mechanism; said toggle mechanism comprising a first lever pivotally connected at one end thereof to said armature and a second lever pivotally connected to the other end of said first lever and having a roller on its other end; said latch being comprised of said roller and a rotatable member; said rotatable member being angularly positioned by said pick-up calibrating screw; said rotatable member having a detent underlying said roller; said control magnet when energized in response to a predetermined current operating said armature mechanism against the action of said biasing means and said latch; said pick-up calibrating screw varying the degree to which said detent underlies said roller to thereby vary the electromagnetic force of said control magnet necessary to overcome said latch to permit movement of said armature mechanism in response to energization of said control magnet.

References Cited in the file of this patent

UNITED STATES PATENTS

| | | |
|---|---|---|
| 991,849 | Herd | May 9, 1911 |
| 1,271,001 | Zimmer | July 2, 1918 |
| 1,288,017 | Johnson | Dec. 17, 1918 |
| 1,310,380 | Whittingham | July 15, 1919 |
| 1,641,643 | Petersen | Sept. 6, 1927 |
| 1,736,438 | Frank | Nov. 19, 1929 |
| 1,878,959 | Magee et al. | Sept. 20, 1932 |
| 2,250,566 | Baker et al. | July 29, 1941 |
| 2,363,606 | Maseng | Nov. 28, 1944 |
| 2,455,704 | Schultz | Dec. 7, 1948 |
| 2,487,025 | Matthews | Nov. 1, 1949 |
| 2,619,562 | Beall et al. | Nov. 25, 1952 |

FOREIGN PATENTS

| | | |
|---|---|---|
| 158,457 | Great Britain | Feb. 10, 1921 |